United States Patent Office 2,872,485
Patented Feb. 3, 1959

2,872,485
PROCESS

Christoph J. Grundmann and Alfred Kreutzberger, Columbus, Ohio, assignors to Olin Mathieson Chemical Corporation, a corporation of Virginia No Drawing. Application September 18, 1956
Serial No. 610,643

6 Claims. (Cl. 260—564)

Our invention relates to the preparation of diformylhydrazine dihydrazone by reaction of anhydrous hydrazine with 1,3,5-triazine.

Diformylhydrazine dihydrazone has previously been prepared from the reaction of anhydrous hydrazine with anhydrous hydrocyanic acid. The yield, however, is very small and the process has the inherent inconvenience of working with the highly toxic and volatile hydrocyanic acid. Our process avoids the use of hydrocyanic acid and employs instead of this poisonous material the practically non-toxic, easily handled 1,3,5-triazine.

The reaction of our invention is represented by the following equation:

$$2C_3H_3N_3 + 9N_2H_4 \rightarrow 3NH_2N=CHNHNHCH=NNH_2 + 6NH_3$$

According to our invention, 1,3,5-triazine is reacted with anhydrous hydrazine, preferably at a temperature from 0° to 40° C., until no more ammonia is evolved. This takes usually from 3 to 12 hours. The reaction is easily carried out by simply admixing the reactants. Because this reaction evolves heat rapidly, even at room temperature, it is preferably carried out in a suitable inert diluent. Such solvents include, for example, the lower aliphatic alcohols as methanol, ethanol, isopropanol and t-butanol, and other solvents such as diethyl ether, tetrahydrofuran and dioxane. All diluents and reactants are preferably anhydrous. Since the reaction product tends to turn pink or red in light, it is advantageous to carry out the reaction in the dark. This contamination, however, can be easily removed by washing the crude diformylhydrazine dihydrazone with ether or petroleum ether, or by briefly exposing the product to a vacuum. Since diformylhydrazine dihydrazone is easily oxidized, better results are obtained if the reaction is carried out in a non-oxidizing atmosphere, for instance as under hydrogen or nitrogen.

Diformylhydrazine dihydrazone is a useful intermediate for the preparation of 1,2,4-triazole and amino-1,2,4-triazole, the latter being known as an excellent herbicide.

1,3,5-triazine can be prepared by reacting hydrochloric acid with hydrocyanic acid and treating the resulting compound with a dehydrohalogenating agent, for example, quinoline.

The following example further illustrates this invention:

To an ice-cooled solution of 3 grams of 1,3,5-triazine in 25 milliliters of anhydrous ether there was added dropwise 5.3 grams of anhydrous hydrazine. During this time, a white solid precipitated, and gaseous ammonia escaped from the reaction mixture. After allowing the reaction mixture to stand for 12 hours at room temperature, the precipitate was filtered by vacuum, washed with 10 milliliters of cold ether and dried over phosphorus pentoxide in a vacuum for 2 hours. The diformylhydrazine dihydrazone so obtained, was a yellowish microcrystalline powder which melted at 117°–118° C. The yield was 5.3 grams or 79 percent of the theory.

This material was further purified by digestion with 5 milliliters of cold absolute alcohol for 30 minutes followed by rapid filtration under a nitrogen atmosphere. About 4.8 grams of pure diformylhydrazine dihydrazone, which melted at 122°–123° C. with decomposition, was obtained.

|  | C | H | N |
|---|---|---|---|
| Calculated for $C_2H_8N_6$ 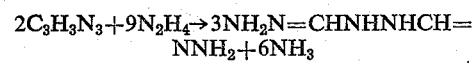 | 20.68 | 6.95 | 72.37 |
| Found | 21.00 | 7.09 | 72.20 |

The following table indicates the yields which were obtained when the procedure of the first paragraph of this example was duplicated except that the various solvents listed below were used instead of the ether solvent.

Solvent: Yield, percent
None _____ 62.4
Dioxane _____ 68.0
Tetrahydrofuran _____ 71.0

We claim:
1. The method of preparing diformylhydrazine dihydrazone which comprises admixing 1,3,5-triazine with anhydrous hydrazine.
2. The method of preparing diformylhydrazine dihydrazone which comprises admixing 1,3,5-triazine with anhydrous hydrazine at a temperature of about 0° to 40° C.
3. The method of preparing diformylhydrazine dihydrazone which comprises admixing 1,3,5-triazine with anhydrous hydrazine in the presence of an inert organic diluent.
4. The method of preparing diformylhydrazine dihydrazone which comprises admixing 1,3,5-triazine with anhydrous hydrazine at a temperature of about 0° to 40° C. and in the presence of an inert organic diluent.
5. The method of claim 1 in which the reaction is carried out in a non-oxidizing atmosphere.
6. The method of claim 4 in which the reaction is carried out in a non-oxidizing atmosphere.

References Cited in the file of this patent

Muller et al.: Chem. Abst., vol. 15, pages 3849–50 (1921).
Grundmann et al.: J. A. C. S. 76, 5646–50 (1954).